United States Patent
Höglund et al.

(10) Patent No.: US 7,532,892 B2
(45) Date of Patent: May 12, 2009

(54) METHOD AND DEVICE FOR CONTROLLING ADMISSION OF USERS TO A CELLULAR RADIO NETWORK

(75) Inventors: Albert Höglund, Helsinki (FI); Kimmo Valkealahti, Helsinki (FI); Jaana Laiho, Veikkola (FI); Janne Pöllönen, Helsinki (FI)

(73) Assignee: Nokia Corporation, Espoo (FI)

( * ) Notice: Subject to any disclaimer, the term of this patent is extended or adjusted under 35 U.S.C. 154(b) by 588 days.

(21) Appl. No.: 10/476,457

(22) PCT Filed: Oct. 19, 2001

(86) PCT No.: PCT/EP01/12135

§ 371 (c)(1), (2), (4) Date: Oct. 31, 2003

(87) PCT Pub. No.: WO02/089512

PCT Pub. Date: Nov. 7, 2002

(65) Prior Publication Data

US 2004/0152422 A1 Aug. 5, 2004

(30) Foreign Application Priority Data

May 2, 2001 (WO) .................. PCT/EP01/04935
May 3, 2001 (WO) .................. PCT/EP01/07647

(51) Int. Cl.
$H04Q$ $7/20$ (2006.01)
(52) U.S. Cl. ............... 455/452.2; 455/452.1; 455/450; 455/453; 455/464; 455/67.11; 455/67.13; 455/561

(58) Field of Classification Search ......... 455/418–420, 455/423–425, 436–438, 450–451, 452.1–2, 455/453–454, 67.11, 13, 67.15–16, 561, 455/562.1, 464, 63.1, 522, 67.13, 67.16
See application file for complete search history.

(56) References Cited

U.S. PATENT DOCUMENTS

| | | | |
|---|---|---|---|
| 5,301,356 A * | 4/1994 | Bodin et al. ............... 455/436 |
| 5,497,504 A * | 3/1996 | Acampora et al. .......... 455/436 |
| 5,623,484 A | 4/1997 | Muszynski |
| 5,701,294 A | 12/1997 | Ward et al. |
| 5,884,174 A * | 3/1999 | Nagarajan et al. .......... 455/436 |
| 6,456,844 B1 * | 9/2002 | Parantainen et al. ........ 455/423 |
| 6,853,846 B1 * | 2/2005 | Lin et al. .................. 455/453 |
| 6,950,656 B1 * | 9/2005 | Bahk et al. ............... 455/436 |

FOREIGN PATENT DOCUMENTS

| | | |
|---|---|---|
| EP | 0 750 440 A2 | 12/1996 |
| EP | 1 077 580 A1 | 2/2001 |
| GB | 2 347 317 A | 8/2000 |
| WO | WO 98/31177 | 7/1998 |

* cited by examiner

*Primary Examiner*—Tuan A Tran
(74) *Attorney, Agent, or Firm*—Squire, Sanders & Dempsey L.L.P.

(57) ABSTRACT

The present invention relates to a method and a cellular radio network device (3) for controlling the admission of user (4, 6) to a cellular radio network (1). In order to determine how much traffic is allowed in a cell (2), threshold values are autotuned using quality measurements gathered during high load on a link. Thus, the network capacity is in increased while fulfilling desired quality requirements.

20 Claims, 8 Drawing Sheets uplink uplink downlink

US 7,532,892 B2

METHOD AND DEVICE FOR CONTROLLING ADMISSION OF USERS TO A CELLULAR RADIO NETWORK

FIELD OF THE INVENTION

The present invention relates to a method and a cellular radio network device for controlling the admission of users to the cellular radio network.

BACKGROUND OF THE INVENTION

In cellular radio systems, such as in WCDMA (Wideband Code Division Multiple Access) or UMTS (Universal Mobile Telecommunications System) systems information is transferred between a network device and a user, such as a mobile terminal, by transmitting signals.

These signals may be distorted on their way from a transmitter to a receiver. Thereby e.g. a modulator of a transmitter, means of transmission, i.e. radio waves, interference sources, fading and demodulator of a receiver have distorting influence on the signals. These factors form a so-called channel. Each base station has a plurality of channels at its disposal. On each channel information is transferred between the base station and the users, thus establishing a connection between a user and the base station. The base station decides whether to admit new users depending on the number of such connections or on the workload of the network. This process of decision is called admission control.

In WCDMA power based admission control can be used in both, uplink and downlink. In uplink there is a cell based threshold for received channel power level. Correspondingly in downlink there is a cell based threshold for transmitted channel power level. These thresholds are used to determine whether to admit a new user or not.

Accordingly these threshold values are used to determine how much traffic is allowed in a cell of the cellular radio network. Thereby it is important to select the correct thresholds. If the threshold values are too low, not all of the capacity of the cellular radio network is utilized. On the other hand, if the threshold values are too high, too many connections are admitted in a particular cell. Thus, the interference increases causing bad quality of the connections between the users and the network, in particular of calls. This is caused by power outage of mobile terminals in uplink and in downlink connections that hit the maximum specific transmission powers, reducing the coverage of the specific cell and making the quality of calls worse.

It is known to manually set threshold values network parameters by choosing a default value. This value is determined for default conditions, i.e. the typical conditions of a network cell are established and the parameter value is chosen to optimize these conditions. Hence the default value is a suitable choice, if the local network conditions correspond largely with the default conditions. But in general the local network conditions differ substantially from the default conditions. Furthermore the optimal setting for a network parameter may change in time. This is particularly true for parameters that are related to propagation conditions for radio waves in a cell or the load of the specific cell. It is known to manually correct the threshold values. However, as the number of cells in a network is very high, in particular more than 10,000, manual correction is a very time-consuming and difficult task.

SUMMARY OF THE INVENTION

It is therefore an object of the present invention to improve the correction of such threshold values.

This object is achieved by a method of admission of users to a cellular radio network, comprising the steps of determining a threshold value for a quantity to be measured, measuring said quantity in order to obtain a measured value, comparing said measured value with said threshold value, and deciding whether to admit a new user based on the result of said comparison, thereby autotuning said threshold value using quality measurements in order to define a required quality of a link, uplink or downlink, said quality measurements being gathered during high load and said link.

Furthermore the above object is achieved by a cellular radio network device for performing that method, namely a cellular radio network device for controlling the admission of users to a cellular radio network, comprising means for determining a threshold value for a quantity to be measured, means for measuring said quantity in order to obtain a measured value, means for comparing said measured value with said threshold value, means for deciding whether to admit a new user based on the result of said comparison, means for autotuning said threshold value using quality measurements in order to define a required quality of a link, uplink or downlink, and means for quality measurements gathered during high load on said link.

Accordingly, the uplink power threshold of a cell is autotuned using quality measurements gathered during high uplink load. The downlink power threshold of a cell is correspondingly autotuned using quality measurements gathered when the cell has been under high downlink load. The thresholds are autotuned so that they are as high as possible while the quality criteria are fulfilled.

In case of poor or degraded quality of link the threshold value is autotuned towards a direction which improves the situation and in the case of high load and better quality of connections than required, the threshold value is autotuned in a direction which increases capacity of the network. Thus, the network capacity is maximized while fulfilling the quality requirements. A capacity quality trade-off can be performed by adjusting the quality criteria. By allowing poorer quality the capacity is increased, thus in particular a higher throughput and/or lower blocking of calls is enabled, while it is correspondingly decreased by requiring very high quality.

The invention is applicable to power based admission control as well as to throughput based or connection based admission control. The corresponding thresholds can thus also be expressed in power units as well as in other than power units: for example throughput units, e.g. kbit/s.

In each case it is possible to use quality criteria to maximize the load level throughputs. All methods are able to provide an equivalent Capacity-Quality trade-off.

The invention enables the optimising of cell-specific thresholds. Commonly, the optimal threshold values vary from cell to cell depending on the radio propagation environment of the cell. In some cells where the propagation environment is good, there is more room for increasing the thresholds to allow more users in the cell, because in this kind of cells the quality of calls does not decrease much when the thresholds are increased. In other cells that have poor propagation environment, the power thresholds should be kept at somehow lower level to meet the quality requirements of the cell. As the different environment of the cells is difficult to take into consideration by static planning of a radio network, the invention in particular overcomes these problems by using a real time monitoring. This is particularly useful, since the thresholds can change over time.

Thus, the invention allows to avoid inaccurate or even incorrect threshold values. Moreover, the invention provides correct cell-specific uplink and downlink (power) threshold values. Thus, the capacity of the network is increased, since usually a network is initially set with (power) threshold values at a too low level to make sure that the required quality criteria are achieved. However, sometimes in a network the (power) threshold values might also be set too high, which results in too high interference (noise) level in a cell causing poor quality of links. This case, according to the invention the thresholds are reduced in order to achieve a quality of a required level.

Preferably, the quality requirements are the actual number of dropped, blocked and/or bad calls and/or the ratio of dropped, blocked and/or bad calls to a total amount of calls; a data throughput of actual transmitted data in uplink and/or downlink; an average frame error rate of defective data frames; delay times of transmitted data packets; and/or retransmission rates of retransmitted data packets due to defective data. The blocked call, the throughput as well as the packet traffic delay criteria improve as the target threshold value is increased and degrade as the target is decreased.

Preferably, the quality of a link is determined by a cost function, said cost function taking into account at least two, more than two or all of the above mentioned quality of link representations, thereby weighing each of the representations. Such a cost function thus describes the quality requirements. It can be minimized by adjusting the target value. As an example a dropped call can be several, e.g. 10 times more severe than a blocked call.

Preferably, quality requirements are drop call or bad call ratios below a certain percentage. The quality of a call can e.g. be considered bad if its average frame error ratio (FER) is above a certain percentage, which is clearly higher than the outer loop FER-target (e.g. average FER above 2% in case of 1% FER-target). An average FER clearly higher than the FER-target means that the mobile device/devices suffer from power outage in uplink and BS (Base Station) from link power outage in downlink. Additionally with packet switched traffic delay and retransmission rates are preferably used for quality measurements. Different traffic classes have different quality criteria, though. For example, the traffic classes in UMTS are: conversational, streaming, interactive, and background. Normally some of the quality classes are less sensitive to poor quality (e.g. background). The traffic classes to be preferably monitored are selected, e.g. conversational and streaming, and then the quality requirements in these classes are satisfied in the method. In uplink the main bitrate to be preferably monitored is the bitrate that has been planned to have coverage in the whole cell area (e.g. 144 kb/s). In downlink preferably all bitrates are monitored, since in downlink link power limits are scaled using bitrates and planned $Eb/No$-values, Eb being the energy per bit and No being the noise power density.

In the autotuning of threshold values it is desired to cope with the mobility of the mobile devices. Therefore, it is advantageously desired to associate to a cell only quality measures of that parts a call that the call is connected to the cell in question. Thereby, poor quality in neighbouring cells is suppressed in order not to affect the autotuning of power thresholds in a cell. Furthermore preferably diversity handover issues are taken into account while evaluating the quality of calls. A possible addition before raising the power threshold in a cell is to check if adjacent cells are suffering from poor quality. If this is the case then it is better not to raise the power threshold.

The autotuning of a parameter setting of a network device of a cellular radio network may be performed according to the present invention by setting the parameter value to a default value, measuring network conditions influenced by said parameter value for a predetermined period of time, calculating a total cost of said network conditions and minimizing the total cost by iteratively changing said parameter value by a step and repeating the measurement of the network conditions and the calculation of the total cost in order to control, whether changing said parameter has reduced the total cost.

By initially setting the parameter value to a default value the initial setting of the parameter is a sound approximation of the optimum value. In case the default conditions correspond essentially to the local conditions the network parameter does not need to be changed much. Thereafter the influence of the default setting on the network conditions is determined. These measurements are performed for a certain time in order to ensure that the measurements reliably reflect the actual network conditions. The optimisation of the network conditions is commenced by iteratively reducing the total cost by changing the parameter value. The result of reducing or increasing the network parameter is controlled by resuming to measure the network conditions and calculating the total cost. By continuously repeating to change the network parameter and controlling the results of such a change the total cost may be reduced.

The reduction of the total cost is basically performed by determining whether the change of the parameter value has increased or decreased the total cost. The direction of change is reversed if the total cost has increased. Otherwise the parameter value may changed similarly once again. Therefore, in case the total cost has decreased, the parameter value is increased by the step, if the parameter value was previously increased, and decreased, if the parameter value was previously decreased. In case the total cost has increased, the parameter value is increased by the step, if the parameter value was previously decreased, and decreased, if the parameter value was previously increased. These steps are continuously performed whereby the total cost approaches a minimum.

The total cost may be defined by a cost function which establishes a relationship between the measured network conditions and the quality of these conditions, i.e. a high total cost stands for bad network conditions and a low total cost stands for good network conditions. The cost function may be chosen according to the preferences of the network provider and its customers. The total cost is determined by calculating the value of the cost function for the present network conditions. The cost function is preferably defined by $C=C1+C2+C3+\ldots$, wherein C1, C2, C3 . . . each indicate the cost of one of the measured network conditions. This means that the total cost is equal to the sum of the individual costs of different network conditions. Different costs may be attributed to different network conditions. This is important if a change of a network parameter may both ameliorate a certain network condition and simultaneously deteriorate another network condition. Furthermore the cost function can be cell specific, i.e. the cost function may be different for the parameter setting of different network devices.

The maximum transmission power which may be transmitted from a network device in order to establish or perpetuate the connection to a single radio access bearer is such a parameter. This parameter is a downlink parameter, i.e. it pertains to the power transmitted from a network device to a radio access bearer and not vice versa. The threshold does not represent a hardware confinement introduced by the network device. Its purpose is to prevent a single radio access bearer in a particular cell from consuming an excessive amount of power of the network device. This is the case, if several radio access bearers within the cell may not be connected to the cellular radio network due to said particular radio access bearer.

Lowering the maximum transmission power to a single user will statistically decrease the number of blocked calls and increase the average number of users simultaneously connected to the network device of the particular cell. At the same time the quality of service is decreased, in particular the connection quality suffers and the number of dropped calls increases. Naturally both the number of dropped calls and the number of blocked calls should be minimal. The choice of the cost function represents the compromise resp. trade-off between these conflicting requirements. The best compromise is reached if the cost function reaches its minimum.

A further important network parameter is the total transmission power which may be emitted by particular network device. An increase of the total transmission power has the effect that more radio access bearers in a particular cell may be admitted to the network. At the same time the power required by individual radio access bearers in the cell becomes higher. Consequently the quality of connection decreases if the required power may not be transmitted due to the threshold limiting the maximum power transmitted to a single user resp. radio access bearer.

Furthermore the portion of the total traffic capacity of the network device dedicated to non real-time traffic is a network parameter that is linked to the quality of service. The quality criteria for non real-time traffic and real-time traffic differ considerably, since the delay of a packet transmission deteriorates the quality of connection in real-time traffic considerably. In case of non real-time traffic a delay in packet transmission is far more tolerable. Therefore, traffic types are grouped into either non real-time traffic and real-time traffic.

Queuing of information packets is usually performed for non real-time traffic only. If the drawback of queuing for non real-time traffic is judged to be far lesser than blocking or dropping in real-time traffic, real-time traffic will occupy almost completely the total traffic capacity of a particular cell during high load. By reserving network capacity of a cell to non real-time traffic a congestion of the cell capacity by real-time traffic during heavy load can be prevented.

The allocation of cell capacity to non real-time traffic may be accomplished in two different ways. According to the "hard territory method" a fixed proportion of cell capacity is reserved for non real-time traffic at all times. Real-time traffic may not occupy non real-time traffic capacity under all conditions. But if non real time capacity is congested and real-time capacity is not, non real-time traffic may occupy parts of the capacity dedicated to real time traffic.

The "soft territory method" allows a reservation of a flexible proportion of the total traffic capacity in the cell to non real-time traffic according to the circumstances. If the load conditions allow it, non real-time traffic may occupy real-time traffic capacity and vice versa. If the traffic capacity currently required by non real-time traffic amounts to the dedicated proportion, non real-time traffic only shall occupy its dedicated proportion. In case real-time traffic is occupying non real-time traffic capacity, real-time traffic is continually reduced until the non real-time traffic completely occupies its dedicated proportion of the total traffic capacity. Equally current non real-time traffic occupying a proportion dedicated to real-time traffic is reduced, if real-time traffic requires more cell capacity.

Reserving a proportion of the cell capacity to a certain traffic class constitutes a trade-off between conflicting quality requirements. Since the proportion of the total cell capacity dedicated to a certain traffic class is limited, the real-time blocking of connections to the network device and non real-time queuing of information packets depends on the limited dedicated capacity. The present invention allows to automatically adjust this parameter according to the local network conditions by minimizing the total cost of real-time blocking and non real-time queuing.

The measured network conditions may comprise any or plural of the following states: The actual number of dropped, blocked and/or bad calls and/or the ratio of dropped, blocked and/or bad calls to a total amount of calls, a data throughput of actual transmitted data in uplink and/or downlink, an average frame error rate of defective data frames, delay times of transmitted data packets, and/or retransmission rates of retransmitted data packets due to defective data. The choice of the measured network conditions depends on the parameter that is being tuned. Only those network conditions are taken into account that are influenced by the parameter being optimised. An alternative measure to queuing is the difference between the average bitrate transmitted to a user and the bitrate requested by the user. An average bitrate lower than the requested bitrate is indicative of a delay in data transmission. The delay in non real-time data transmission may also be used as a measure instead of queuing.

Since certain network conditions may vary by a considerable amount, even if the network parameter is not altered, an expectation value of the network condition is acquired. The variance of the network condition is presumed to follow a predetermined probability distribution and the expectation value and the standard deviation are computed accordingly.

If the traffic capacity of the network device dedicated to non real-time traffic is optimised, the total cost may be determined by the cost of queued non real-time data packets added to the cost of blocked calls. Preferably the total cost is iteratively minimized by increasing the dedicated proportion of the total traffic capacity by a step if the cost of the queued non real-time data packets is greater than the cost of the blocked calls. On the one hand the number of queued non real-time data packets decreases, if the proportion of the traffic capacity dedicated to non real-time traffic is increased, since more network capacity is available for non real-time traffic. On the other hand the number of blocked calls increase, since less total network capacity is dedicated to real-time traffic. If the cost of queuing outweighs the cost of blocked calls, the total cost is reduced. For similar reasons the portion of the total traffic capacity is decreased by the step if the cost of the blocked calls is greater than the cost of the queued non real-time data packets.

If the maximum transmission power, which may be transmitted from the network device to a single radio access bearer, is optimised, the total cost is preferably determined by the sum of the cost of queued non real-time data packets, the cost of blocked calls, the cost of bad quality and the cost of dropped calls. Increasing the maximum transmission power to a single user reduces queuing and dropping of calls, since data packets are queued and calls are dropped only, if the available transmission power is insufficient. Therefore said maximum transmission power is increased by a step, if the cost of bad calls added to the cost of dropped calls is prevailing, and decreased, if the cost of queued data packets added to the cost of blocked calls is prevailing.

The autotuning of the total maximum transmission power is performed similar to the autotuning of the maximum transmission power, that may be transmitted to a single radio access bearer. The total cost amounts to the cost of packet queuing, bad calls, dropped calls and blocked calls. The total maximum transmission power is increased or decreased depending on whether the cost of bad calls and dropped calls or the cost of packet queuing and blocked calls prevails. Increasing the total maximum transmission power lowers the number of blocked calls and queued data packets and the corresponding costs. At the same time the quality of connection is reduced and the number of dropped calls rise, whereby the corresponding costs increase.

Both changing the maximum transmission power to a single radio access bearer and the total transmission power of a network device influences the same network conditions and the corresponding total cost. For example, it might be favourable to increase the total transmission power under certain circumstances leading to less blocked and dropped calls. But since the connection quality is reduced at the same time the power required by the individual radio access bearers might increase considerably. If the maximum transmission power is not high enough the number of blocked and dropped calls might increase eventually. Hence the tuning of both parameters needs to be dealt with in a coordinated fashion. This problem arises whenever two parameters are tuned that effect the same network conditions.

According to the present invention plural parameters of a network device of a cellular radio network are optimised by successively optimising each parameter, i.e. reducing the total cost by iteratively changing the parameter. The parameters are optimised one at a time. All parameters except for the parameter being optimised are left unchanged, until the tuning of the parameter is halted. The tuning of the parameter may be halted due to different criteria. For example, tuning may be halted after a predetermined number of changes to the parameter. Then the next parameter is optimised, whereby the remaining parameters are fixed. After all parameters have been optimised consecutively the successive tuning of each parameter is resumed. Preferably the total maximum transmission power, which may be transmitted from the network device, and the maximum transmission power, which may be transmitted from the network device to a single radio access bearer are tuned according to this method.

Summarized, due to invention the network capacity is maximized while fulfilling the quality requirements. Furthermore, due to the invention operability and optimisation is increased.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 1:
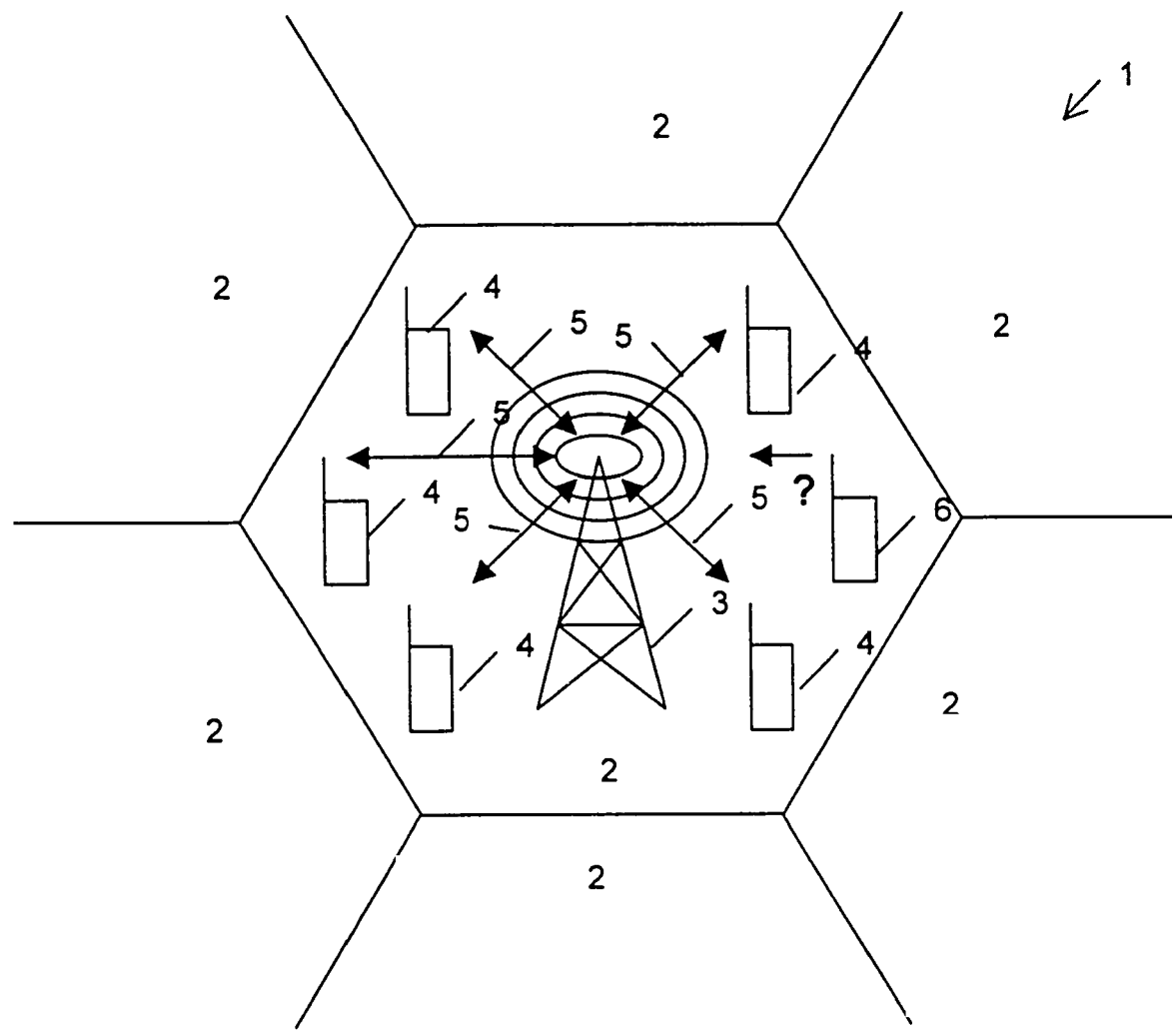
FIG. 1 shows a cellular radio network.

FIG. 1 illustrates a cellular radio network 1 comprising a number of cells 2 adjoining to each other. Each cell 2 is radio covered by a network device 3 for connecting users 4 or mobile devices to the network 1. The users 4 are each connected via respective radio connections 5 to the network 1.

It should be noted that the network device 3 in this example comprises admission control functionality. However the admission control may be implemented also in some other device in some other cell 2. In UMTS networks the admission control is located in RNC (radio network controller) which is controlling many base stations which are connected to the users' 4 user equipments. The admission control may be implemented also in the base stations. The radio interference between network device 3 (base station) and user 4 (user equipment) is implemented preferably by using CDMA technique (including WCDMA).

This method is applicable independent of the location of the admission decision. Admission decision can also be distributed in several network elements. Admission control is preferably performed at:

RAB (Radio Access Bearer) establishment,
RAB renegotiation,
Handover.

Admission control is in particular responsible for:

radio bearer parameter selection (must include new shared channel parameters), and radio bearer QoS (Quality of Service) negotiation and renegotiation.

In particular it finds out if there are cell resources available. This may be taken as the actual admission.

The parameters related to admission control are preferably:

RAB (Radio Access Bearer) QoS parameters (core network),
Cell capability (OMS),
MS (mobile station) capability (core network),
Cell measurements: load, interference (BTS—Base Transceiver Station),
Load information from NRT users (PS),
MS measurements, dl interference, neighbour cell measurements (MS),
PDCP (Packet Data Convergence Protocol)/RLC (Radio Link Control) resources (BSGW),
GERAN: frequency and TSL specific idle channel interference, used in DFCA (neighbor CRS),
GERAN: multi carrier power amplifier (MCPA), cell total transmitted power (BTS), and/or
PDCP/RLC resources (reported periodically by BSGW).

Admission control functionalities locations are preferably as follows: UCF makes the AC decision and takes care of signaling. RNAS selects BSGW and RNGW. UCF selects the L2/L1 parameters that are not dependent on the cell status.

CRS makes admission control for physical resources. CRS selects the L2 µl parameters that are related on the cell status.

If a new user 6 intends to establish a connection 5 with the network 1 the network device 3 decides whether to admit the new user 6 to the network 1 or not.

If a certain threshold value, in particular a power threshold value would be exceeded in case of admittance, the new user 6 is rejected. Accordingly, the new user 6 is admitted to the network 1, in case of the power threshold value not being exceeded in case of admittance.

In order to perform the decision, whether or not to admit a new user, an actual power value is measured, the increased power value in case of admittance is estimated and compared with the power threshold value.

According to the preferred embodiment of the present invention, the threshold value is not constant, but varies depending on quality requirements of the respective link, namely the uplink or downlink. These quality requirements are gathered during high link load of the respective link.

Figure 2:
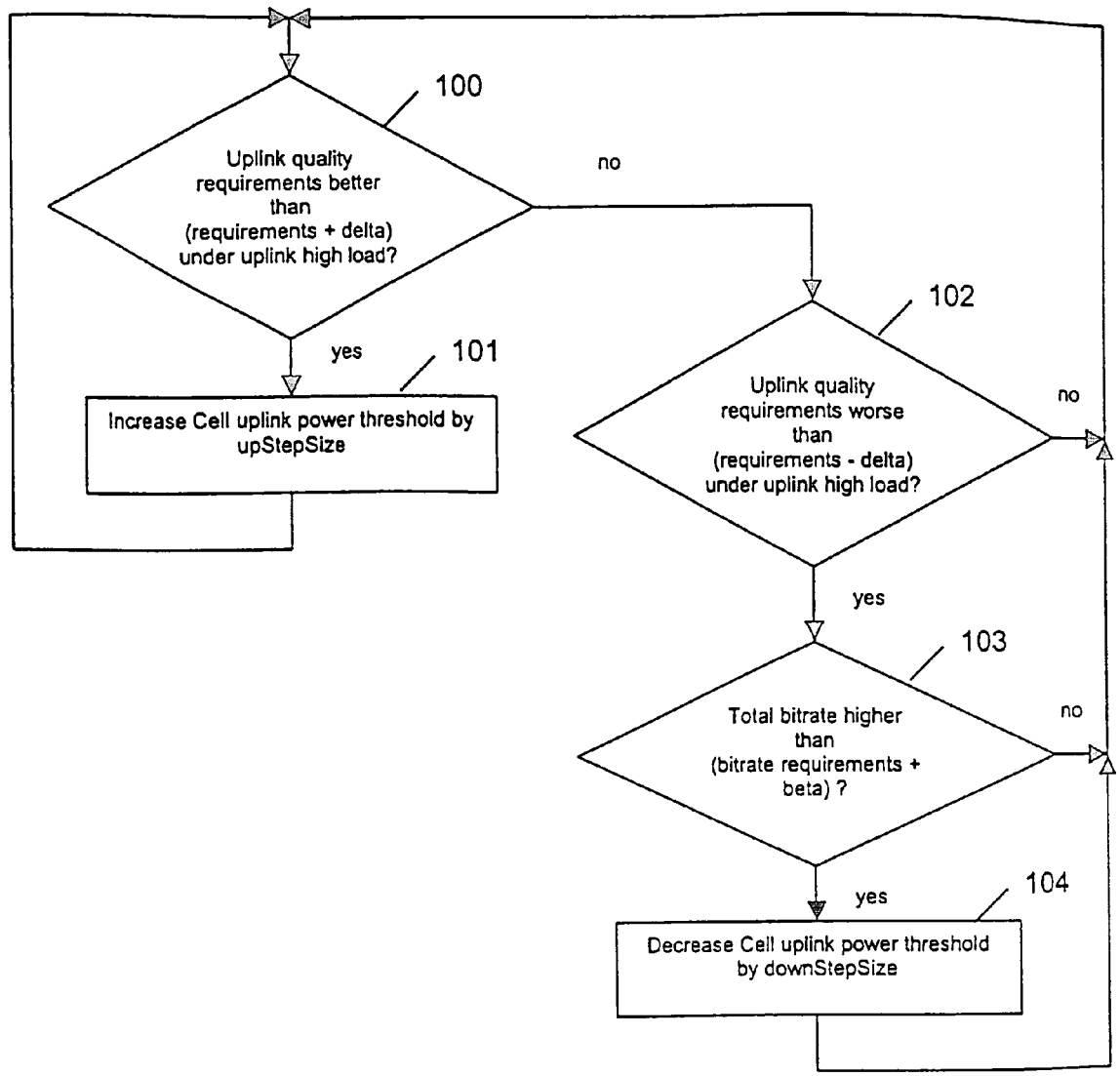
FIG. 2 shows the autotuning of an uplink power threshold value.

FIG. 2 shows the adjustment of cell uplink power threshold. In step 100 it is evaluated whether the uplink quality requirements are better than a predetermined value under high uplink load. This predetermined value is calculated by a fixed value, called "requirements" added by a difference value, called "delta". Binomial confidence intervals can be used to determine delta. E.g. a delta equaling two binomial standard deviations would correspondingly mean that the probability of a quality different than the requirements is 95%.

In case of the uplink quality requirements being better than "requirements +delta". in step 101 the cell uplink power threshold is increased by a certain value upStepSize, e.g. 0.3 dB.

After increasing the uplink power threshold in step 101 the procedure returns to step 100.

However, if in step 100 the uplink quality requirements are not better than "requirements + delta" under uplink high load, the procedure turns to block 102 evaluating whether the uplink quality requirements are worse than a further predetermine value, called "requirements − delta", calculated by subtracting "delta" from "requirements". Correspondingly as in the uplink case binomial confidence intervals can be used to determine delta.

If the uplink quality requirements are not worse than "requirements − delta" under uplink high load the procedure turns from step 102 back to step 100 performing the above described evaluation in step 100.

However, if the uplink quality requirements are worse than "requirements − delta" under uplink high load, according to Step 103 it is further evaluated if the total throughput is higher than a predetermined value calculated by a fixed bitrate requirement value, called "bitrate requirements" added by further difference value, called "beta", thus generating a value called "bitrate + beta". Additionally the blocking rate should be below "blocking rate requirement−gamma". Binomial confidence intervals can be used to determine gamma and e.g. Gaussian confidence intervals to determine beta.

If the total bitrate is not higher than "bitrate + beta" the procedure returns back to step 100 performing the above described evaluation.

However, if in step 103 it is evaluated that the total bitrate is higher than "bitrate + beta", in step 104 the cell uplink power threshold is decreased by a predetermined value, namely by downStepSize.

After performing the adjustment of the power threshold according to Step 104, it is continued with step 100 as described above.

Figure 3:
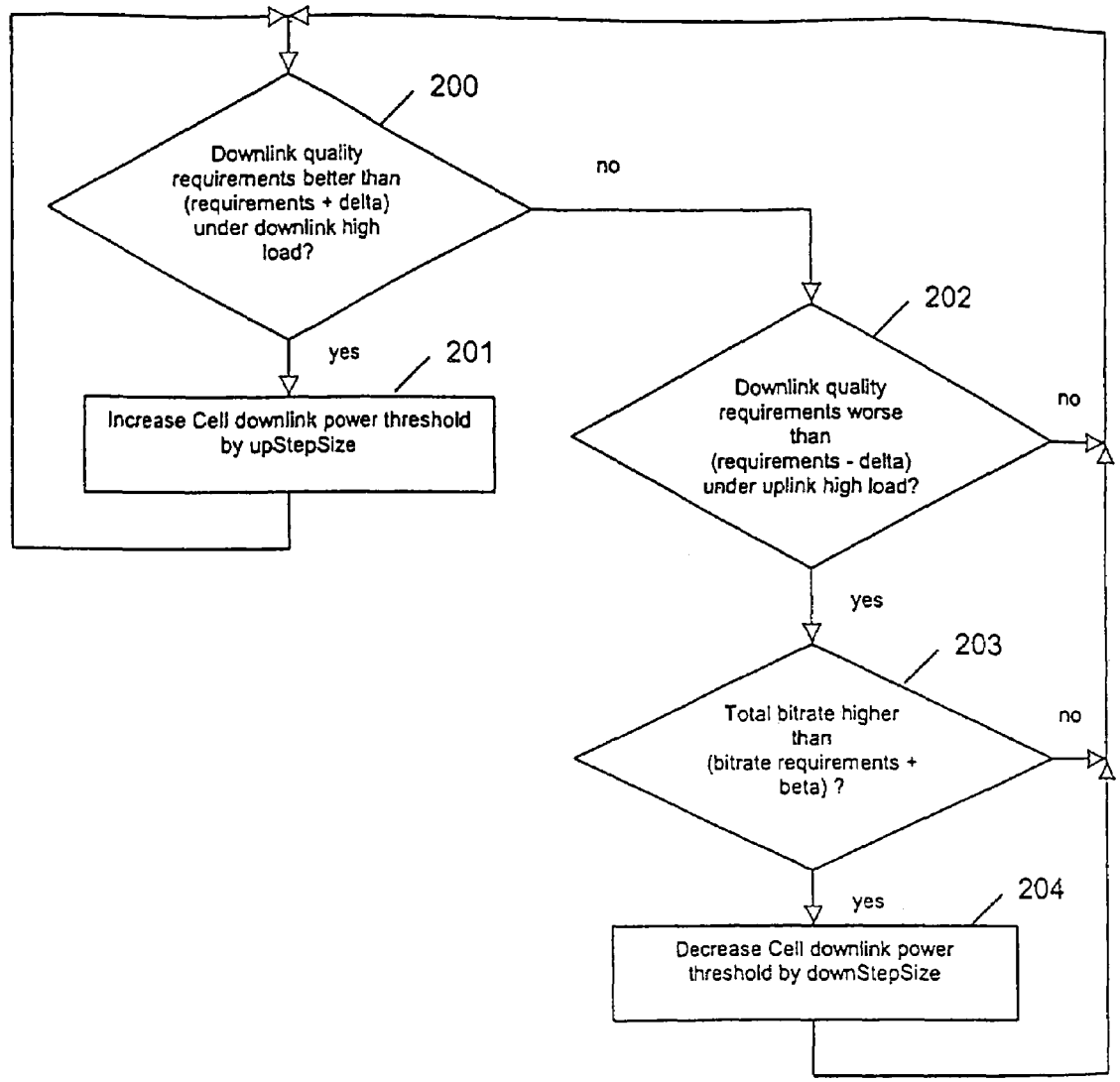
FIG. 3 shows the autotuning of a downlink power threshold value.

The adjustment of a cell downlink power threshold is described hereinafter:

FIG. 3 shows the adjustment of cell downlink power threshold. In step 200 it is evaluated whether the downlink quality requirements are better than a predetermined value under downlink high load. This predetermined value is calculated by a further fixed value, called "requirements" added by a further difference value, called "delta".

In case of the downlink quality requirements being better than "requirements+delta" in step 201 the cell downlink power threshold is increased by a certain value upStepSize.

After increasing the downlink power threshold in step 201 the procedure returns to step 200.

However, if in step 200 the downlink quality requirements are not better than "requirements+delta" under downlink high load, the procedure turns to block 202 evaluating whether the downlink quality requirements are worse than a further predetermine value, called "requirements−delta", calculated by subtracting "delta" from "requirements".

If the downlink quality requirements are not worse than "requirements − delta" under downlink high load the procedure turns from step 202 back to step 200 performing the above described evaluation in step 200.

However, if the downlink quality requirements are worse than "requirements−delta" under downlink high load, according to Step 203 it is further evaluated if the total bitrate is higher than a predetermined value calculated by a fixed bitrate requirement value, called "bitrate requirements" added by further difference value, called "beta", thus generating a value called "bitrate + beta". Additionally the blocking rate should be below "blocking rate requirement−gamma". Binomial confidence intervals can be used to determine beta and gamma.

If the total bitrate is not higher than "bitrate + beta" the procedure returns back to step 200 performing the above described evaluation.

However, if in step 203 it is evaluated that the total bitrate is higher than "bitrate + beta", in step 204 the cell downlink power threshold is decreased by a predetermined value, namely by downStepSize.

After performing the adjustment of the power threshold according to Step 204, it is continued with step 200 as described above.

Furthermore, an actual load value of the uplink and/or downlink is determined. This actual load value is compared with a predefined load value in order to determine high load. Thereafter a quality measurement is performed if said actual load value exceeds the predefined load value, i.e. if high load has been determined. Thus, critical requirements during high load are detected.

Figure 4:
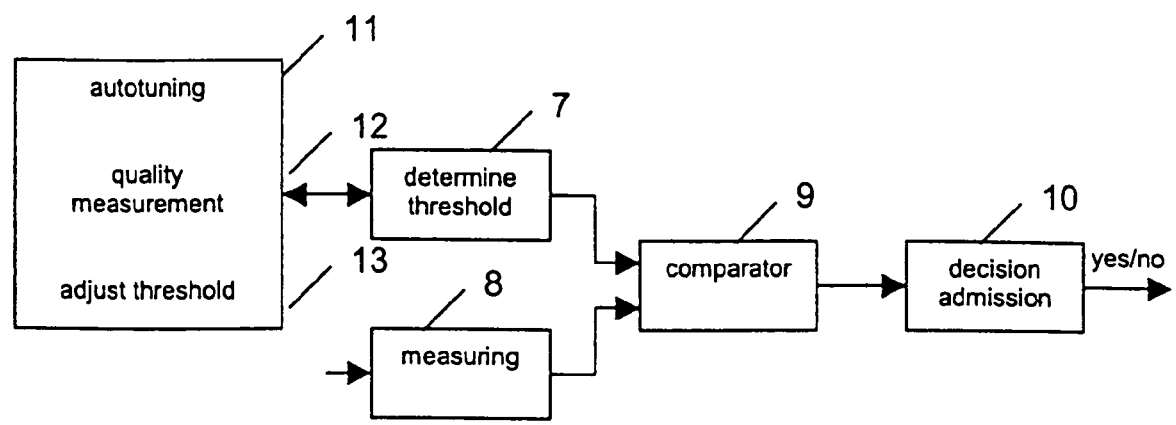
FIG. 4 shows a diagram of specific elements of a cellular radio network device.

FIG. 4 shows a block diagram of components of a cellular radio network device 3 for performing the above described method.

The device 3 comprises a unit 7 for determining and/or storing a power threshold value as well as the unit 8 for measuring a power value. Unit 8 may comprise also means for averaging short term power levels. Both units 7 and 8 are connected with a comparator 9 for comparing the measured power value with the power threshold value.

The comparator 9 is connected to a decision unit 10 which is deciding whether to admit a new user to the network. The decision is made on the basis of the result of the comparison performed by comparator 9.

Furthermore, an autotuning unit 11 is provided for autotuning the threshold value using quality measurements in order to define a required quality of a link, namely uplink or downlink, and a quality measurement unit 12 for quality measurements gathered during high load on uplink or downlink.

Furthermore, an adjustment circuit 13 is provided with the autotuning unit 11 for increasing the threshold value if an actual quality of the link is better than the required quality of the link or decreasing the threshold value if the actual quality of the link is worse than the required quality of the link, in particular if a total throughput of the link is higher than a required bitrate and the blocking rate is lower than a blocking criteria.

In the above described embodiment high load can be determined as follows: A normal criteria for high load could be that the average received and/or transmitted power of the channel has an average value within a certain, preferably predetermined margin, in particular within a 0.5 dB margin of the power threshold. If the power threshold for some reason has been set too high, it means that the system still can suffer from bad quality but does not reach the high load state. In practice this is not a problem. However, preferably a possibility is provided to check quality for looser high load situations (threshold −1 dB, threshold −1.5 dB, threshold −2 dB) if high load state is newer reach. If it is reached and quality is good the high load criteria can be increased again, but if it is poor the admission power threshold can be lowered.

It is noted that the above described algorithm can be performed either in an automatic mode or a manual mode. In the manual mode an operator decides whether to accept the suggested changes or not. In this case the implementation of the algorithm is preferably located near RNC (radio network controller) or the network management system. In the automatic mode the location is preferably the RNC. In future IP RAN (Internet Protocol Radio Access Network) networks some RNC functionalities are located in the base stations and the admission control functionalities may also be located in the base stations or distributed to the radio access network.

Figure 5:
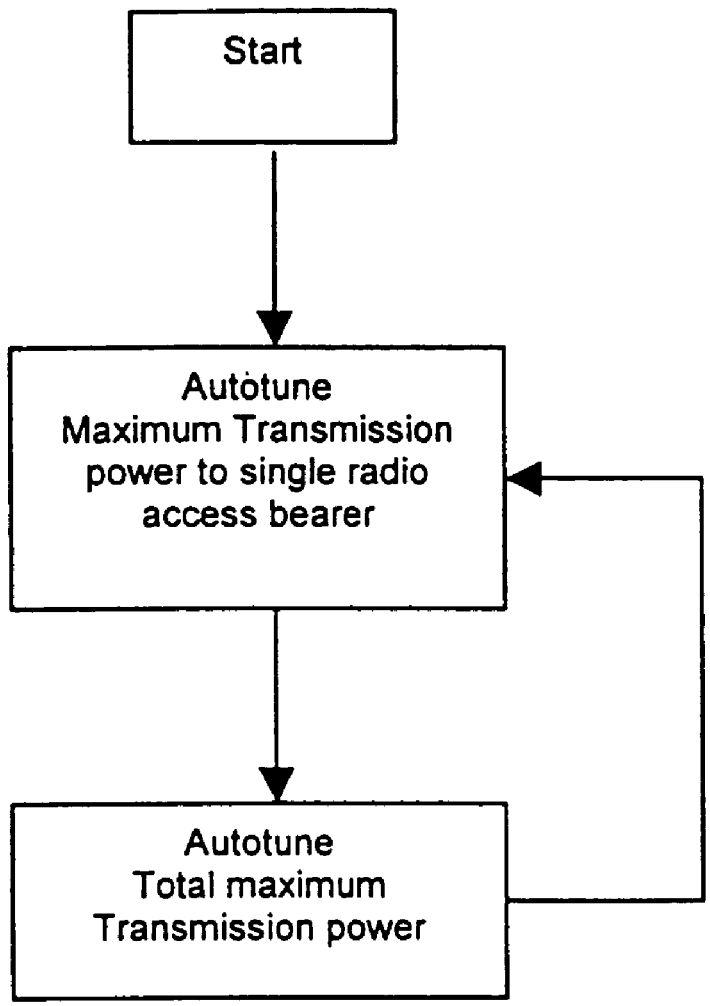
FIG. 5 shows, how two network parameters are tuned simultaneously.
Figure 6:
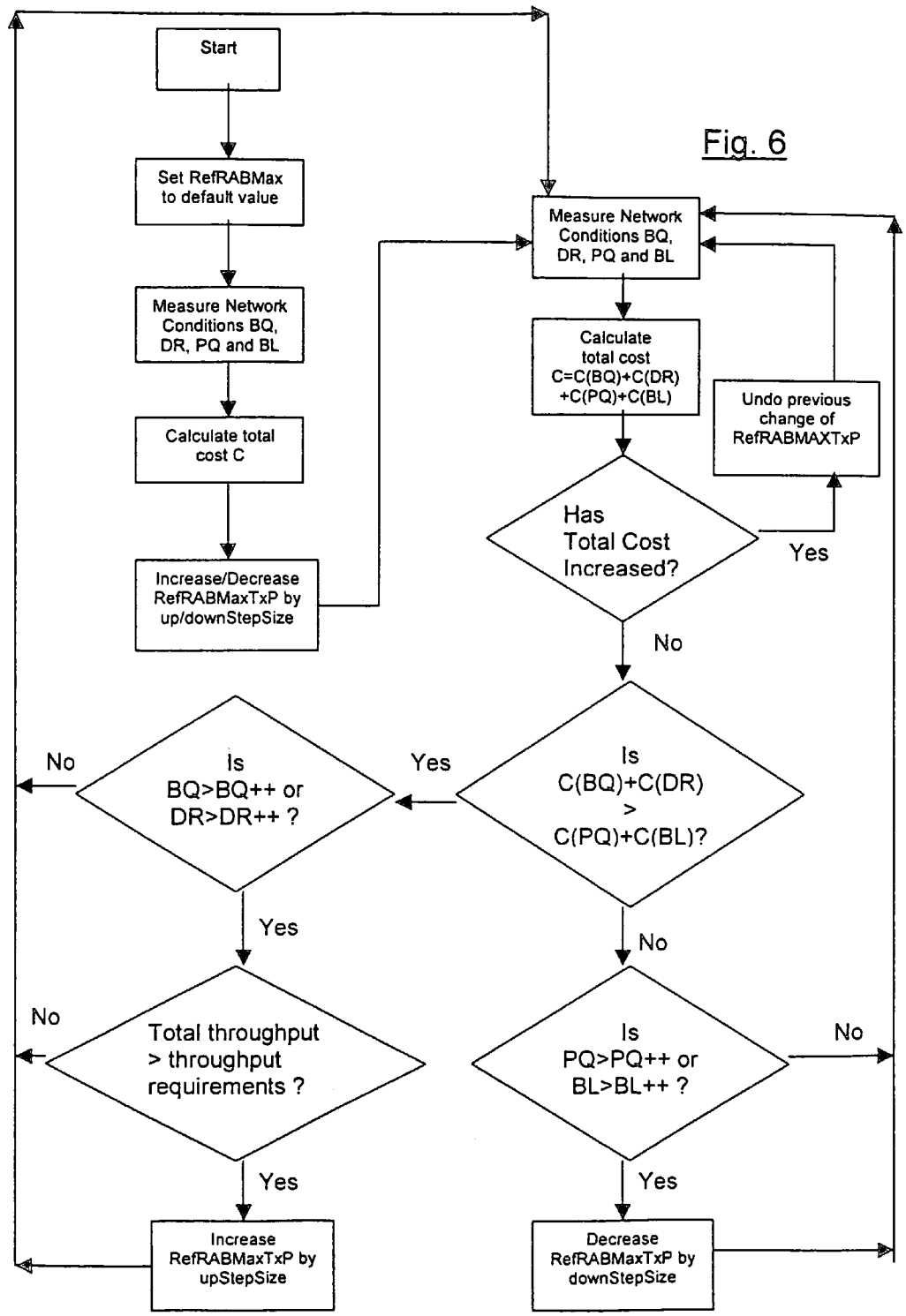
FIG. 6 shows the autotuning of the maximum transmission power, which may be transmitted to a single user.
Figure 7:
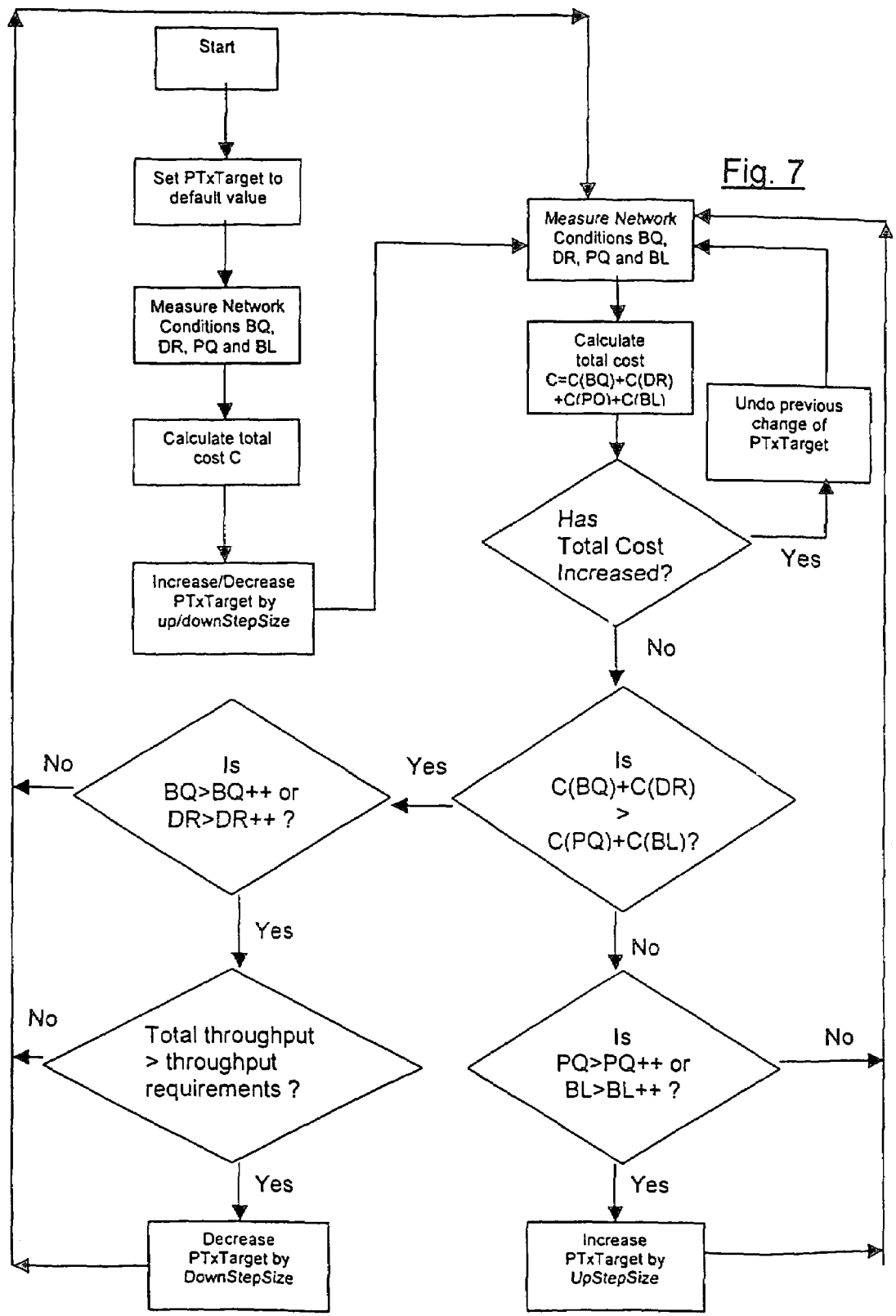
FIG. 7 shows the autotuning of the total transmission power, which may be transmitted by a network device.

In FIG. 5 the tuning of the maximum transmission power to a single radio access bearer (RefRABMaxTxP) and the tuning of the total maximum transmission power of a network device (PTxTarget) in particular a base station 3 is exemplified. Both the RefRABMaxTxP and the PtxTarget effect the number of queued packets, blocked or dropped calls as well as the quality of connection. The autotuning of both parameters is performed by alternately tuning the RefRabMaxTxP and the PtxTarget. FIGS. 6 and 7 show how both targets are individually optimised. The tuning of the RefRABMaxTxP starts with setting the parameter values of the RefRABMaxTxP and PTxTarget to a default value. The default value preferably corresponds to a favourable setting of these parameters in default conditions, i.e. under ordinary conditions.

Subsequently the network conditions are measured and the individual costs of the network conditions is calculated. The network conditions include the bad quality of connections (BQ), the number of dropped calls (DR), the number of queued packets (PQ) and the number of blocked calls (BQ).

The previous steps of the embodiment of FIG. 6 represent the initial phase which is performed only once. The following steps are iteratively performed, wherein each loop of the algorithm commences with measuring the network conditions and calculating the total cost. The cost function is equal to the sum of the cost of the individual network conditions ($C_{BQ}$(BQ), $C_{DR}$(DR), $C_{PQ}$(PQ), $C_{BL}$(BL). Preferably the individual costs simply amount to the measured network condition multiplied with an individual cost factor.

The network conditions are measured for a predetermined period of time. This has two reasons. First of all the measurement period has to be long enough in order to obtain trustworthy measurement result. Secondly the measurement time determines the speed with which the RefRABMaxTxP is optimised, since the measurement is performed between each change of the parameter. If the network provider wants to adapt the network parameters cautiously the measurement time will be chosen to be long and the step size (DownstepSize or UpstepSize) will be rather small. In this case the RefRABMaxTxP will gradually approach its optimal value.

Following the calculation of the total cost, the change of the total cost is determined. The total cost of the present parameter setting is compared to the total cost of the previous parameter setting. If the total cost has increased the previous change is taken back, since it constituted a deterioration of the overall network conditions.

In case the total cost has decreased the following steps determine whether the parameter is to be changed once again. It is initially determined whether the cost of bad quality connections (BQ) and dropped calls (DR) outweigh the cost of packet queuing (PQ) and blocked calls (BL).

The question of increasing or decreasing the RefRABMaxTxP is made to depend upon whether the cost of bad quality (BQ) and dropped calls (DR) prevails. If this is answered in the affirmative it is preferable to increase the maximum transmission power to a single radio access bearer (RefRABMaxTxP) since this will reduce the bad quality (BQ) and the number of dropped calls (DR). But such an increase is not performed unconditionally.

The increase of the RefRABMaxTxP is performed only under the circumstances that either the measured bad quality (BQ) or the measured dropped calls (DR) exceed a respective threshold value BQ++ or DR++ and that the total throughput lies above a minimum throughput requirement. The threshold values BQ++ and DR++ indicate that the value of the measured bad quality (BQ) and dropped calls (DR) is significantly bigger than a desired level. The total throughput of a cell equals the number of bits transferred within a period of time, e.g; 1000 kilobit/second. Only if the total throughput exceeds a threshold value, i.e. the minimum throughput requirement, a change of the RefRABMaxTxP may be performed. If one of these requirements are not fulfilled, the parameter is left unchanged and measurement of network conditions is resumed.

These additional requirements effect that the RefRABMaxTxP is changed cautiously. Increasing the RefRABMaxTxP in general reduces the total throughput of a cell. Therefore an increase is only allowed if the total throughput is acceptable. Furthermore an increase of the RefRABMaxTxP will only take place if the previously mentioned network conditions are clearly inacceptable.

The previous steps are performed if the total cost C of bad quality calls (BQ) and dropped calls (DR) exceeds the cost of packet queuing (PQ) and blocked calls (BL). Otherwise the algorithm proceeds differently. An excessive amount of packet queuing and blocked calls can be dealt with by decreasing the maximum power which may be transmitted to a single radio access bearer (RefRABMaxTxP). A decrease of the RefRABMaxTxP is only allowed if the measured value for packet queuing (PQ) or the measured value for blocked calls (BL) are well above an acceptable level. This is determined by comparing the measured values with respective threshold values (PQ++ and BL++). An excessive value for one of the two quality measurements leads to a decrease of the RefRABMaxTxP by a predetermined step (downStepSize). Finally the measurement of the network conditions is resumed.

FIG. 7 shows the autotuning of the admission threshold for total maximum network device transmission power (PtxTarget). This target is autotuned only after the tuning of the RefRABMaxTxP has been completed. The handover between the tuning of these parameters may be performed after a predetermined period of time, a certain number of changes to the respective parameter or another suitable criterion. The initial setting of the PtxTarget and RefRABMaxTxP is only performed once, i.e. in case a parameter tuning handover has taken place the targets are not reset to the respective default values.

The algorithm illustrated in FIG. 7 corresponds to the one shown in FIG. 6 with two exceptions.

In case the cost of bad quality (C(BQ)) and dropped calls (DR) prevails, the measured value for bad quality (BQ) and dropped calls (DR) exceeds the corresponding threshold values (BQ++ and DR++) and the total throughput is greater than the minimum throughput requirements the PtxTarget is decreased by a downStepSize. The reason for this is that a decrease of the total maximum transmission power (PtxTartget) enhances the quality of calls and reduces the number of dropped calls. But the number of radio access bearers is reduced leading to a reduced total throughput. Therefore the reduction of the PtxTarget is only performed if the total throughput resides within an allowed range.

In case the cost of packet queuing (C(PQ)) and blocked calls (BL) prevails and the measured value for packet queuing (C(PQ)) and blocked calls (BL) exceeds the corresponding threshold values (PQ++ and BL++) the PtxTarget is increased by an upStepSize. This change leads to a reduction of the cost of packet queuing and blocked calls.

The previous embodiment for tuning both the total maximum power that a network device may transmit and the maximum power for a single radio access bearer relates to tuning downlink parameters only. A precise measurement of bad quality is essential for the tuning of these parameters. In downlink the quality of connection to a radio access bearer, in particular a mobile station, can be determined in two different ways. Either the mobile station measures the quality of radio reception, e.g. by measuring the block error ratio (BLER), and reports the results to the network device or the network device measures the quality of connection is on its own. A good measure for determining the quality of the downlink connection is power outage. Power outage occurs whenever the mobile station requires more power to be transmitted than allowed for. An increase of power is only requested if the quality of reception is not sufficient. The threshold for detecting power outage may be set according to a fixed value determined for default conditions. The tuned RefRABMaxTxP may also serve as threshold for power outage.

In general the maximum power that may be transmitted to one radio access bearer is different for different service classes and services, e.g. conversational, streaming, interactive, and background. The maximum transmission power may optimised for one service of a certain service class (reference service) only. The maximum transmission power for the other services is then scaled according to the result attained for the maximum transmission power for the reference service-. This may be done by the application of the following formula:

$$P_{tx,max} = P_{tx,max,ref} * (\rho * R)/(\rho_{ref} * R_{ref})$$

$P_{tx,max,ref}$ stands for the maximum transmission power of the reference service and $P_{tx,max}$ stands for the maximum transmission power of another service. Pref is the planned downlink Eb/No value for the reference service, p is the planned downlink Eb/No value for the other service. Rref and R designate the planned bitrate for the reference service and the other service. The quality criteria such as bad quality, dropping, queuing and blocking of calls can be measured in respect of services and service classes other than the reference service class.

Figure 8:
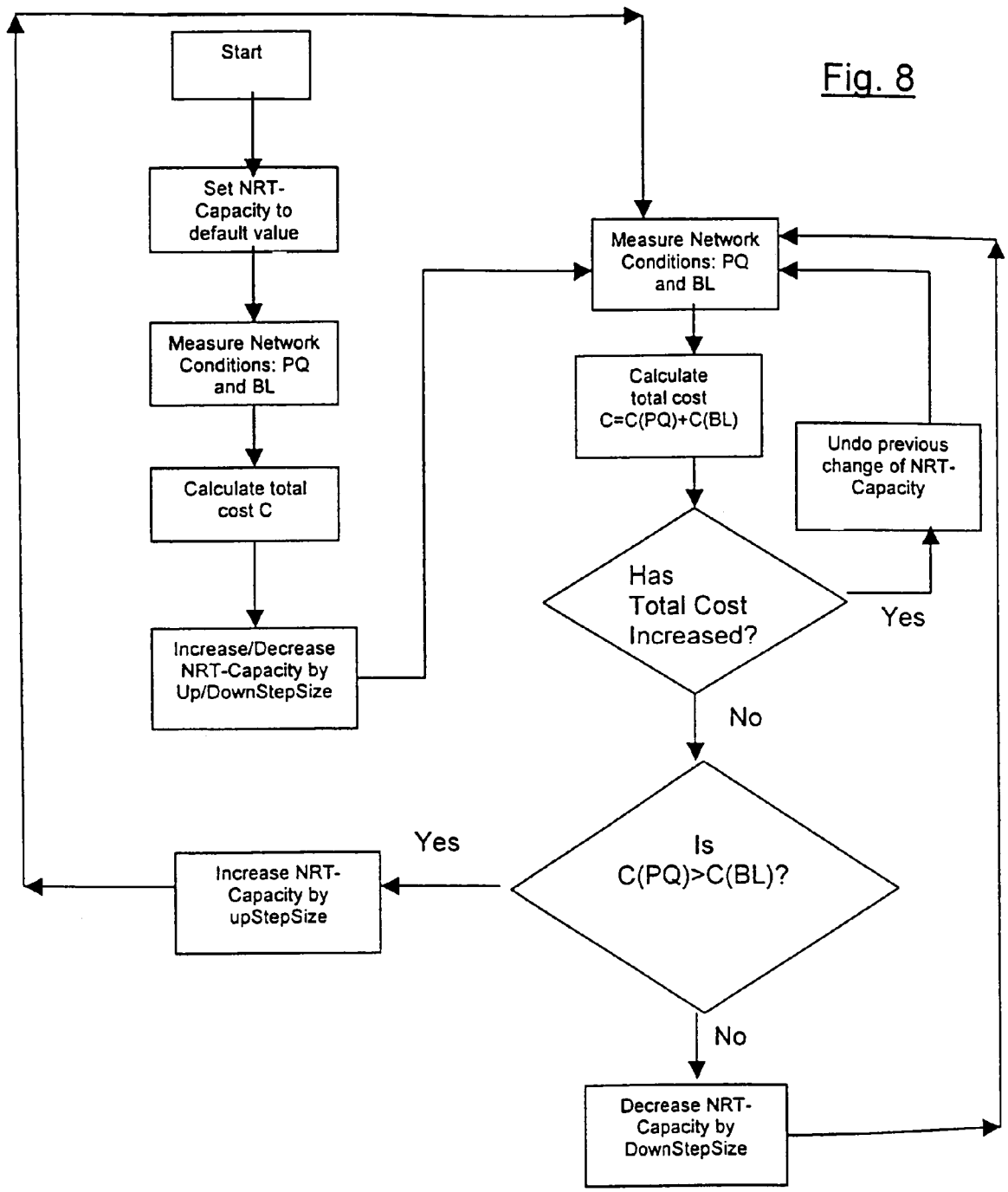
FIG. 8 shows the autotuning of the proportion of the traffic capacity of a cell, which is reserved for non real-time traffic.

FIG. 8 shows a method for optimising the proportion of the traffic capacity of a network device dedicated to non real-time traffic (NRT-capacity). The initial 8 steps correspond essentially to the steps outlined for the algorithms displayed in FIGS. 6 and 7. Initially the default value is chosen for the NRT-capacity. Then the network conditions of non real-time packet queuing and blocked calls (real-time) are measured. The individual costs of these network conditions is measured and the cost of packet queuing and the cost of blocked calls are compared with each other.

If the total cost has not increased the NRT-capacity is increased or decreased by an upStepSize or downStepSize depending on whether the cost of packet queuing is greater than the cost of blocked calls. Since packet queuing is only performed for non real time traffic the cost of packet queuing represents the shortcomings of the dedicated NRT-capacity. Instead of queuing data packets calls are blocked in real-time traffic services. Therefore the number of blocked calls depicts the state of the real-time services. If the cost of packet queuing outweighs the cost of blocked calls NRT-capacity is increased, otherwise it is decreased. After a change to the NRT-capacity the measurement of the network conditions is resumed.

Subsequently the total cost is calculated. If the total cost has increased the previous change of the NRT-capacity is taken back and measurement of network conditions and calculation of total cost is resumed. A change to the NRT-Capacity may be made to depend upon whether the measured values for packet queuing (PQ) or blocked (BL) exceeds predetermined threshold values (PQ++ or BL++). Accordingly the dedicated NRT-Capacity is increased only, if packet queuing has exceeded the threshold value PQ++, and is decreased, if the value for blocked calls has exceeded the corresponding threshold value BL++.

It is noted that the present invention is not restricted to the preferred embodiment described above. In particular the thresholds can be additionally used for further purposes as for how to schedule packets. The power or throughput thresholds set the limits for the amount of packets that can be scheduled. The preferred embodiment may thus vary within the scope of the attached claims.

The invention claimed is:

1. A method, comprising: at a radio network,
   determining a threshold value for a quantity to be measured;
   measuring said quantity in order to obtain a measured value;
   comparing said measured value with said threshold value;
   deciding whether to admit a new user based on the result of said comparison; and
   autotuning said threshold value by a predetermined stepped value using quality measurements in order to define a required quality of a link, uplink or downlink, wherein said quality measurements are gathered during high load on said link.

2. The method according to claim 1, further comprising:
   configuring said threshold value to be a channel power threshold value indicating a maximum admissible received channel power level in uplink, and/or a maximum admissible transmitted power level in downlink; and
   configuring said quantity to be measured to be a channel power level of received power in uplink and/or a channel power level of transmitted power in downlink.

3. The method according to claim 1, further comprising:
   configuring said threshold value to be a throughput threshold value indicating a maximum admissible data throughput in uplink and/or downlink; and configuring said quantity to be measured to be a throughput level of received data in uplink and/or a throughput level of transmitted data in downlink.

4. The method according to claim 1, further comprising:
configuring said threshold value to be a connection threshold value indicating a maximum admissible number of connections between users and said network, and said quantity to be measured being a actual number of connections.

5. The method according to claim 1, further comprising:
representing said quality of a link by
the actual number of dropped, blocked and/or bad calls and/or the ratio of dropped, blocked and/or bad calls to a total amount of calls,
a data throughput of actual transmitted data in uplink and/or downlink,
an average frame error rate of defective data frames,
delay times of transmitted data packets, and/or
retransmission rates of retransmitted data packets due to defective data.

6. The method according to claim 5, further comprising:
determining said quality of a link by a cost function, said cost function taking into account at least two, more than two or all of the quality of link representations, thereby weighing each of said representations.

7. The method according to claim 1, further comprising:
determining an actual load value of said link;
comparing said load value with a predefined load value in order to determine high load; and
performing a quality measurement if said actual load value exceeds the predefined load value.

8. The method according to claim 1, further comprising:
performing said autotuning by increasing said threshold value if an actual quality of said link is better than said required quality of said link.

9. The method according to claim 1, further comprising:
performing said autotuning by decreasing said threshold value if an a quality of said link is worse than said required quality of said link.

10. The method according to claim 9, further comprising:
performing said decreasing if a total bitrate of said link is higher than a required bitrate.

11. The method according to claim 9, further comprising:
performing said decreasing if a blocking rate is below a blocking rate criteria.

12. The method according to claim 1, further comprising:
autotuning said threshold value as high as possible while fulfilling said required quality of said link.

13. The method according to claim 1, further comprising:
defining said required quality depending on traffic classes, so that different traffic classes have different required qualities.

14. The method according to claim 1, further comprising:
scheduling data packets depending on said threshold value (cell uplink/downlink power threshold).

15. The method according to claim 1, further comprising:
performing said autotuning continuously in order to allow real time monitoring.

16. The method according to claim 1, further comprising:
using autotuned power or throughput thresholds in/for packet scheduling.

17. An apparatus, comprising:
means for determining a threshold value for a quantity to be measured,
means for measuring said quantity in order to obtain a measured value,
means for comparing said measured value with said threshold value,
means for deciding whether to admit a new user based on a result of said comparing means,
means for autotuning said threshold value by a predetermined stepped value using quality measurements in order to define a required quality of a link, uplink or downlink, and
means for quality measurements gathered during high load on said link.

18. The apparatus according to claim 17, said means for autotuning comprising means for adjusting said threshold value (cell uplink/downlink power threshold), by
increasing said threshold value (cell uplink/downlink power threshold) if an actual quality of said link is better than said required quality of said link, or
decreasing said threshold value (cell uplink/downlink power threshold) if said actual quality of said link is worse than said required quality of said link, in particular if a total bitrate of said link is higher than a required bitrate.

19. An apparatus, comprising:
a determining unit configured to determine a threshold value for a quantity to be measured,
a measuring unit configured to measure said quantity in order to obtain a measured value,
a comparator configured to compare said measured value with said threshold value,
a deciding unit configured to decide whether to admit a new user based on a result of said comparator,
an autotuning unit configured to autotune said threshold value by a predetermined stepped value using quality measurements in order to define a required quality of a link, uplink or downlink, and
a unit configured to obtain quality measurements gathered during high load on said link.

20. The apparatus according to claim 19, said autotuning unit comprising an adjusting unit configured to adjust said threshold value (cell uplink/downlink power threshold), by
increasing said threshold value (cell uplink/downlink power threshold) if an actual quality of said link is better than said required quality of said link, or
decreasing said threshold value (cell uplink/downlink power threshold) if said actual quality of said link is worse than said required quality of said link, in particular if a total bitrate of said link is higher than a required bitrate.

* * * * *